3,438,893
DESALINATION OF WATER WITH THERMALLY REVERSIBLE WATER-SWELLABLE RESINS
Robert E. Anderson and Giffin D. Jones, Midland, Mich., assignors to The Dow Chemical Company, Midland, Mich., a corporation of Delaware
Filed Oct. 7, 1966, Ser. No. 585,025
Int. Cl. C02b 1/18
U.S. Cl. 210—59   9 Claims

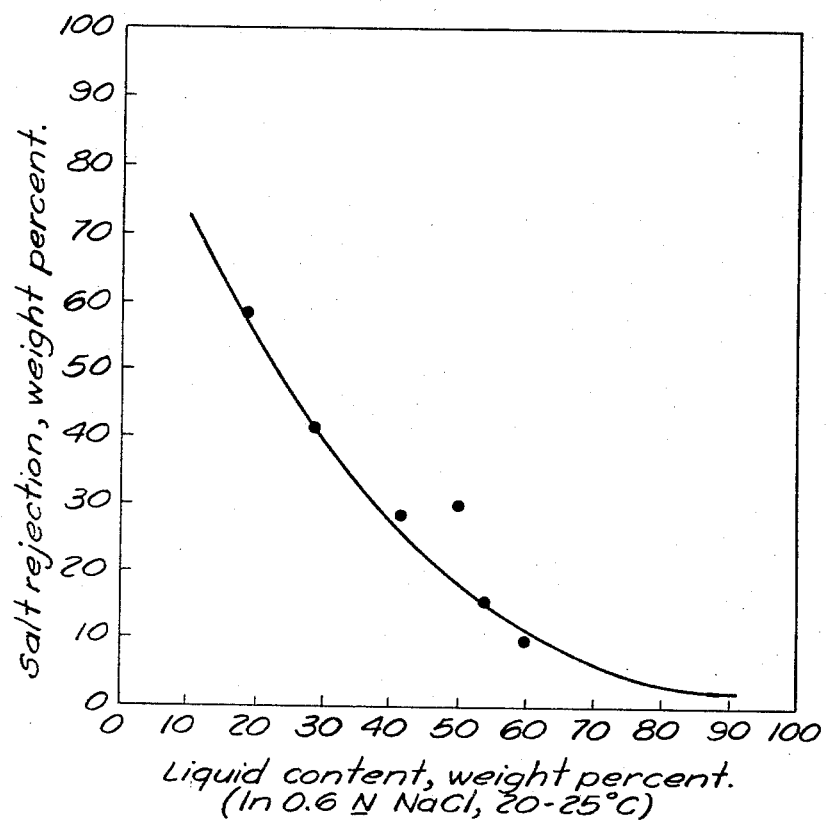

ABSTRACT OF THE DISCLOSURE

An improved process for the desalination of water by selective extraction of water with a thermally-reversible, water-swellable resin is achieved by using a crosslinked polymeric ether as the selective resin. Among the suitable polymeric ethers are crosslinked polyvinyl ethers with a carbon-oxygen atomic ratio (C/O ratio) of about 2.0–3.0, polyalkyleneoxypolyols with a C/O ratio af about 2.0–4.0, and alkylcellulose ethers with a C/O ratio of about 1.4–2.0.

---

Certain organic materials have an inverse water solubility, e.g., a solubility in water that decreases with increasing temperature. Often, the water solubility of these materials changes quite markedly within a relatively narrow temperature range. This phenomenon has been employed in purifying brackish or saline water by extraction of water with a liquid water-soluble amine such as triethylamine or methyldiethylamine. But extractant loss, toxicity of residual amine, and precipitation of calcium and magnesium ions by these liquid extractants present serious process problems.

Recently Bloch in U.S. Patent 3,234,125 described a desalination process utilizing the inverse water solubility of a vast group of oxygen-containing polymers. The resinous polymers disclosed by Bloch were of many types, all containing multiple oxygen-bearing functional groups and having an average of about 2–8 carbon atoms per functional oxygen-bearing group. In this Bloch process, the polymer in unswollen form is contacted with the saline water forming a resin hydrate. Then the solid hydrate is recovered and separately heated to release the water of hydration having a substantially reduced salt content.

The basic concept of the Bloch process has been independently confirmed. In addition, several further parameters have been discovered which define critical limits for an improved desalination process using certain water-swellable, thermally reversible, polymeric ethers. Particularly important is the discovery that with certain polymeric ethers, such as polyvinyl ethers, polyalkyleneoxy polyols, or alkyl cellulose ethers, both the liquid capacity and salt rejection under normal operating conditions are directly influenced by the degree of polymer crosslinking. Furthermore, the liquid content of the polymeric ether resin swollen in 0.6 N aqueous sodium chloride has been found to be a valid and useful operational criterion in evaluating the polymeric ether resins for use in the resin desalination process.

The present invention thus is an improvement in the Bloch resin desalination process achieved by employing as the thermally reversible water absorbing resin, a polymeric ether characterized by (A) a carbon to oxygen ratio of about 1.4–4.0 and (B) an equilibrium liquid content in 0.6 N NaCl at 25° C. of about 10–75 weight percent. It has been found that these resins equilibrated with 0.6 N NaCl at about 25° C. have a liquid rejection of about 5–45 weight percent when heated at 65°–70° C. to release the absorbed water. Polymeric ethers having a lower equilibrium liquid content than about 10 percent have inadequate water capacity for practical operation while those with a higher equilibrium liquid content than 75 percent have inadequate salt rejection.

The operational characteristics of these polymeric ethers in the desalination process are dependent on their water-swellability, a property that is influenced by chemical composition, crystallinity and degree of crosslinking. Thus the composition as reflected in the carbon-oxygen atomic ratio affects the essential hydrophilic balance of the resin. The degree of crystallinity and crosslinking is critical in achieving a selective salt rejection when the unswollen resin contacts the saline water as well as in providing adequate physical strength for repeated use.

Polymeric ether resins having the above characteristics equilibrate rapidly and selectively with saline water at about room temperature and release purified water when heated to 30°–80° C., conditions particularly desirable for practical operation of a desalination process. Furthermore these polyether resins are easily prepared and selectively modified to obtain optimum properties by minor changes in polymerization conditions or by simple subsequent treatment of the polymer as, for example, by crosslinking with high energy irradiation or a polyfunctional reagent.

As used herein the terms "liquid content," "liquid rejection" and "salt rejection" are defined as follows:

$$\text{Liquid content (wt. percent)} = \frac{W_S - W_D}{W_S} \times 100$$

$$\text{Liquid rejection (wt. percent)} = \frac{W_S - W_R}{W_S} \times 100$$

$$\text{Salt rejection (wt. percent)} = \frac{C_0 - C_R}{C_0} \times 100$$

where
$W_D$ = Weight of dry, unswollen resin at temperature $T_1$;
$W_S$ = Weight of water-swollen resin at temperature $T_1$;
$W_R$ = Weight of recovered resin after desorption at $T_2$;
$C_0$ = Initial salt concentration of solution; and
$C_R$ = Salt concentration in recovered water.

These properties are readily determined by simple techniques. To reflect practical operating conditions, they are determined herein using a standard 0.6 N aqueous NaCl solution with initial absorption at room temperature of about 20°–25° C. and desorption at 65°–75° C.

In contrast with the thermally reversible solvent extraction process wherein tertiary amines are particularly effective, oxygen-containing polymers are clearly preferred as selective, water absorbing, insoluble resins. Although the detailed mechanism for the selective water absorption by these hydrophilic polymers is not known, reversible solvation involving hydrogen bonding with the oxygen atoms is undoubtedly an important factor.

The present improved process requires a crosslinked, water insoluble but water-swellable polymeric ether which absorbs water from a brackish or saline solution at a temperature $T_1$ and exudes a portion of this water at a higher temperature $T_2$. At the same time the polymer must selectively reject the dissolved salts and be sufficiently stable mechanically in both the unswollen and water-swollen form to withstand repeated use. These properties have been found to an enhanced degree with certain crosslinked polymeric ethers which contain an average of about 1.4–4.0 carbon atoms per oxygen atom. Furthermore at least 60 mole percent and preferably at least 75 mole percent of the oxygen should be present as $C_1$–$C_4$ alkyl ether or alkylene ether group e.g., as a group of the formula —OR or —OR'— wherein R and R' are a $C_1$–$C_4$ alkyl or a $C_1$–$C_4$ alkylene group respectively. Particularly suitable are crosslinked polyvinyl ethers with a carbon-oxygen atomic ratio (C/O ratio) of about 2.0–3.0, polyalkyleneoxy polyols with a C/O ratio of about 2.0–4.0, and alkyl cellulose ethers with a C/O ratio of about 1.4–2.0.

The required crosslinked, water-swellable polymeric ethers can be obtained by a variety of means. For example, a water-soluble polyvinyl methyl ether can be crosslinked by irradiation to give a water-insoluble, but water-swellable resin useful in the desalination process. Such a polyvinyl methyl ether consists essentially of a plurality of polymeric units or mers of Formula I:

(I)

wherein R is methyl and the polymer has a C/O ratio of about 3.0.

Alternately methyl vinyl ether can be copolymerized with a divinyl ether to obtain a suitable polyvinyl ether. Or a divinyl ether can be homopolymerized to give a suitable crosslinked polymer. Thus homopolymerization of the divinyl ether of diethylene glycol gives a polyvinyl ether having a C/O ratio of about 2.0 crosslinked through the side chain vinyl ether group.

Also commercial polyalkyleneoxy polyols prepared by reaction of a polyol such as ethylene glycol, glycerine or trimethylolpropane with a $C_2$–$C_4$ alkylene oxide such as ethylene oxide, propylene oxide or butylene oxide and mixtures thereof can be crosslinked by irradiation or by reaction with a suitable polyfunctional crosslinking agent such as tolylene diisocyanate. These polyols consist essentially of a plurality of mers of Formula II:

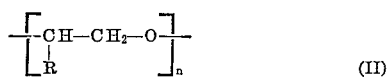
(II)

wherein each R individually is H or a $C_1$–$C_2$ alkyl group and have a C/O ratio of about 2.0–4.0.

Other suitable polymeric ethers include crosslinked alkyl cellulose ethers consisting essentially of a plurality of mers of Formula III:

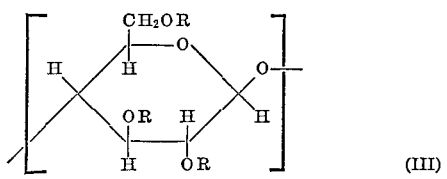
(III)

wherein each R is individually H, a $C_1$–$C_4$ alkyl, or a $C_2$–$C_4$ monohydroxyalkyl group provided that not more than 2 are H. These cellulose ethers have a C/O ratio of about 1.4–2.0 and can be readily crosslinked to the desired degree by reaction of residual hydroxyl groups with a diisocyanate or other suitable crosslinking reagent.

The polymeric ethers must have a sufficiently high molecular weight and degree of crosslinking so that the solid polymer is stable and water-insoluble under normal operating conditions in both the unswollen and water-swollen forms. But beyond these required mechanical properties, it has been discovered that the polymeric ethers suitable for use in this improved process are characterized by an easily determined operational property, e.g., the equilibrium liquid content of the resin swollen in a saline solution at room temperature.

The importance of this property in relation to the essential selectivity of the polymeric ether in rejecting salt when contacted with saline water is shown in the figure. Data for this figure was obtained using a 0.6 N NaCl solution to approximate the salinity of sea water and an initial temperature of 20°–25° C., conditions suitable for rapid screening of various polymeric ethers. Since a minimum salt rejection of at least 5 weight percent is desirable for practical operation of the resin desalination process with an initial ambient temperature, suitable polymeric ethers must have an equilibrium liquid content in 0.6 N NaCl at 25° C. of less than 75 weight percent.

As a further test, the polymer equilibrated with 0.6 N NaCl at about 25° C. is heated at 65°–70° C. and the water rejection determined. Useful polymeric ethers have been found to have a liquid rejection under these conditions of about 5–45 weight percent.

While these test conditions are generally in the desirable range for practical operation, they are not necessarily optimum conditions. Thus in practice water sorption is preferably carried out at ambient temperature, normally between about 15°–30° C., with desorption at a somewhat higher temperature, usually between 30°–80° C. and preferably at about 60°–70° C.

In practice the polymeric ether is preferably used in a solid particulate form similar to a commercial ion-exchange resin. Indeed the present process can advantageously be carried out in equipment similar to that used in conventional ion-exchange operations. Thus saline water at $T_1$ can be passed through a bed of resin particles in the water absorption cycle. Then, after draining the more concentrated residual salt solution, the resin can be heated to $T_2$ to release purified water from the swollen particles. This can be achieved in the same column or in a separate desorption unit in a batch or continuous operation.

Recovery of at least one part of purified water per four parts of water-swollen resin is clearly feasible with these selective polymeric ether resins. Although the energy requirements of this improved thermally reversible resin extraction process may be somewhat greater than for some desalination processes, the process is adaptable to widely different natural and technological resources throughout the world.

To illustrate the present invention and its advantages, the following examples are given. Unless otherwise specified, all parts and percentages are by weight.

Example 1.—Polymerized divinyl ether of diethylene glycol (A) A homopolymer of the divinyl ether of diethylene glycol was prepared by adding several drops of concentrated HCl containing about 10 percent $SnCl_4$ to 25 grams of the divinyl monomer. When the vigorous exothermic reaction subsided, the grainy solid homopolymer was crushed into particles that would pass through a No. 8 mesh sieve. To remove water-soluble impurities, the crushed polymer was extracted with water for 30 hrs. in a Soxhlet and then thoroughly dried.

(B) A sample of the dry, unswollen homopolymer was shaken with 3–5 volumes of 0.6 N NaCl at room temperature and allowed to equilibrate for 2–4 hours. Then the resin was recovered by filtration and its liquid content determined by weighing. To release the absorbed water, the swollen resin was transferred to a closed container and heated at 80° C. overnight. Then the desorbed resin and released water were separately recovered. The desorbed resin was again shaken with 0.6 N NaCl and the desalination process repeated. After several cycles, the recovered resin was weighed and the combined recovered water weighed and analyzed for sodium chloride.

Using the formulas given above the liquid content, liquid rejection and salt rejection of the poly(divinyl diethylene glycol ether) were calculated.

|  | Percent |
|---|---|
| Liquid content swollen in 0.6 N NaCl at 25° C. | 54.7 |
| Liquid rejection at 80° C. | 23.0 |
| Salt rejection | 15.8 |

Example 2.—Poly(vinyl methyl ether)

A commercial poly(vinyl methyl ether) crosslinked by irradiation into a water-insoluble polymer was crushed into buckshot size particles. Then 15 parts of the polymer was equilibrated overnight with several volumes of 0.6 N NaCl. The swollen resin (23.7 parts) was recovered and heated at about 70° C. for 8 hours.

In 3 cycles 20.8 parts of purified water (NaCl content—0.091 N) was recovered. Because of experimental difficulties, an accurate calculation of the salt rejection was not possible. However, the average liquid content of the resin swollen in 0.6 N NaCl was 37 percent and the salt rejection was at least 30–40 percent, thus demonstrating good selectivity and capacity at ambient temperature as well as effective desorption at about 70° C.

Example 3.—Other polymeric ether resins (A) To study the requirements for selective extraction of water from saline solutions with other polymeric ether resins, the general test procedure described in Example 1B was standardized. Thus a resin sample is mixed with about 3–5 volumes of 0.6 N NaCl at room temperature and allowed to stand for at least 2–4 hours to equilibrate. After recovering and weighing the swollen resin it is placed in a closed glass container and heated in an oven at 65°–70° C. for at least 4 hours and preferably overnight to achieve maximum water desorption. Except with very frail resins, most samples are taken through several cycles before final weighings, analysis and calculation of the liquid content, liquid rejection and salt rejection.

(B) Typical results for a number of polymeric ethers are given in Table 1 and the figure. Besides showing the utility of these resins, the data also reflect the influence of varying the hydrophilic balance of the resin on the liquid content, liquid rejection and salt selectivity. This is particularly evident with the series of cross-linked polyethyleneoxy and polypropyleneoxy polyols (Runs 1-2 to 1-5).

We claim:

1. In a process for the desalination of water by contacting a solid thermally-reversible water-swellable resin with saline water to form a water-swollen resin and thereafter separating and heating the swollen resin to release water having a reduced salt content, the improvement which consists essentially in employing as the thermally-reversible resin a crosslinked polymeric ether characterized by having:
   (A) at least 60 mole percent of the oxygen present as $C_1$–$C_4$ alkyl or alkylene ether groups;
   (B) a carbon to oxygen atomic ratio of about 1.4–4.0; and
   (C) an equilibrium liquid content in 0.6 N NaCl at 25° C. of about 10–75 weight percent.
2. The process of claim 1 carried out within a temperature range of about 15°–80° C.
3. The process of claim 1 wherein the polymeric ether is a polyvinyl ether having a carbon to oxygen ratio of about 2.0–3.0.
4. The process of claim 3 wherein the polymeric ether is a homopolymer of the divinyl ether of diethylene glycol.
5. The process of claim 3 wherein the polymeric ether is a poly(vinyl methyl ether) crosslinked by irradiation.
6. The process of claim 1 wherein the polymeric ether is a water-swellable polyalkyleneoxy polyol having a carbon to oxygen ratio of about 2.0–4.0.
7. The process of claim 6 wherein the polyalkyleneoxy polyol is crosslinked with tolylenediisocyanate.

TABLE 1.—DESALINATION WITH THERMALLY REVERSIBLE POLYMERIC ETHERS

| Run | Test polymer | | | Liquid content, $T_1$ (percent) | Liquid rejection, $T_2$ (percent) | Salt rejection (percent) |
| --- | --- | --- | --- | --- | --- | --- |
| | Initial polyether | C/O ratio | Crosslinker | | | |
| 1-1 [1] | Poly(DVEDG) | 2.0 | | 55 | 23 | 16 |
| 1-2 [2] | PG 15-200 | 2.5 | 20% TDI | 50 | 32 | 30 |
| 1-3 [2] | PG 15-200 | 2.5 | 24% TDI | 43 | 26 | 29 |
| 1-4 [3] | 67% PG 15-200+33% CP 3000 | 2.7 | 16% TDI | 28 | 15 | 43 |
| 1-5 [3] | 33% PG 15-200+67% CP 3000 | 2.8 | 10% TDI | 19 | 10 | 58 |
| 1-6 [4] | Methocel 60 HG | 1.6 | HCHO, HCl | 60 | 29 | 10 |

[1] Poly(divinyl ether of diethylene glycol); Example 1.
[2] Polyglycol 15-200, a glycerine based copolymer of equimolar ethylene and propylene oxide from the Dow Chemical Co., crosslinked with tolylenediisocyanate.
[3] A mixture of Polyglycol 15-200 and Polyglycol CP 3000, a polypropylene glycol with an average M.W. of about 3,000 from the Dow Chemical Co., crosslinked with TDI.
[4] A commercial hydroxypropyl methyl cellulose ether containing 28–30%–$OCH_3$ and 7–12%–$OC_3H_6OH$ groups crosslinked with HCHO and HCl.

Example 4.—Other polymers

For comparison using the standard test of Example 3, a polymer of N-ethylacrylamide crosslinked with methylenebisacrylamide had a high thermally reversible water capacity (about 96%) but a salt rejection of only 2%. A 50% hydrolyzed poly(vinyl acetate) (Resin D–381 from Shawinigan Resin Corporation) had insufficient strength for desorption at 60°–70° C. A 70% hydrolyzed poly(vinyl acetate) crosslinked by peroxide treatment had an 88% liquid capacity at room temperature, a 30% liquid rejection at 65° C. but a salt rejection of about 2%.

8. The process of claim 1 wherein the polymeric ether is an alkyl cellulose ether having carbon to oxygen ratio of about 1.4–2.0.
9. The process of claim 8 wherein the polymeric ether is a crosslinked hydroxypropyl methyl cellulose.

References Cited

UNITED STATES PATENTS 3,234,125   2/1966   Bloch _____ 210—59
3,234,126   2/1966   Bloch _____ 210—59

MICHAEL E. ROGERS, *Primary Examiner.*